(12) United States Patent
Kinoshita et al.

(10) Patent No.: US 7,982,785 B2
(45) Date of Patent: Jul. 19, 2011

(54) STREAKING CORRECTION SIGNAL GENERATING CIRCUIT, STREAKING CORRECTION SIGNAL GENERATING METHOD, PROGRAM, STREAKING CORRECTING CIRCUIT, AND IMAGING DEVICE

(75) Inventors: Yukihiro Kinoshita, Kanagawa (JP);
Kazushige Takahashi, Kanagawa (JP);
Manabu Hara, Kanagawa (JP)

(73) Assignee: Sony Corporation (JP)

( * ) Notice: Subject to any disclaimer, the term of this patent is extended or adjusted under 35 U.S.C. 154(b) by 671 days.

(21) Appl. No.: 12/074,476

(22) Filed: Mar. 4, 2008

(65) Prior Publication Data

US 2008/0231732 A1    Sep. 25, 2008

(30) Foreign Application Priority Data

Mar. 20, 2007   (JP) ................ P2007-071699

(51) Int. Cl.
*H04N 9/64* (2006.01)
(52) U.S. Cl. ..................................... 348/248
(58) Field of Classification Search .......... 348/241, 348/243, 248, 249
See application file for complete search history.

(56) References Cited

U.S. PATENT DOCUMENTS

| | | | |
|---|---|---|---|
| 7,218,351 B2* | 5/2007 | Miyahara et al. | 348/313 |
| 7,463,294 B2* | 12/2008 | Tsuda | 348/251 |
| 7,679,661 B2* | 3/2010 | Kondo | 348/294 |
| 7,733,393 B2* | 6/2010 | Yoshida et al. | 348/249 |
| 2005/0073597 A1* | 4/2005 | Rengakuji et al. | 348/241 |
| 2006/0006426 A1* | 1/2006 | Inaba | 257/223 |
| 2006/0092287 A1* | 5/2006 | Hara et al. | 348/222.1 |
| 2006/0114342 A1* | 6/2006 | Egawa | 348/241 |
| 2006/0232692 A1* | 10/2006 | Takane | 348/248 |
| 2006/0274173 A1* | 12/2006 | Yoshida et al. | 348/294 |
| 2010/0103293 A1* | 4/2010 | Yoshida et al. | 348/249 |

FOREIGN PATENT DOCUMENTS

| | | |
|---|---|---|
| JP | 7-067038 A | 3/1995 |
| JP | 2002-281343 A | 9/2002 |
| JP | 2004-289559 A | 10/2004 |
| JP | 2005-130331 A | 5/2005 |
| JP | 2006-024985 A | 1/2006 |
| JP | 2006-025148 A | 1/2006 |
| JP | 2007-053691 A | 3/2007 |
| WO | 2007-020930 | 2/2007 |

OTHER PUBLICATIONS

European Search Report, EP 08250958, dated Mar. 1, 2010.

* cited by examiner

*Primary Examiner* — Nicholas G Giles
(74) *Attorney, Agent, or Firm* — Lerner, David, Littenberg, Krumholz & Mentlik, LLP

(57) ABSTRACT

A streaking correction signal generating circuit includes a light-shield waveform detecting unit configured to detect signal levels of respective lines in a horizontal light shield by using an output signal of the horizontal light shield of an image sensor; a black level detecting unit configured to detect a black level by using an output signal of a vertical light shield of the image sensor; and a subtracting unit configured to subtract the black level detected by the black level detecting unit from each of the signal levels of the respective lines in the horizontal light shield detected by the light-shield waveform detecting unit so as to generate streaking correction signals of the respective lines.

8 Claims, 13 Drawing Sheets

123

123

STREAKING CORRECTION SIGNAL GENERATING CIRCUIT, STREAKING CORRECTION SIGNAL GENERATING METHOD, PROGRAM, STREAKING CORRECTING CIRCUIT, AND IMAGING DEVICE

CROSS-REFERENCE TO RELATED APPLICATIONS

The present application claims priority from Japanese Patent Application No. JP 2007-071699 filed in the Japanese Patent Office on Mar. 20, 2007, the entire content of which is incorporated herein by reference.

BACKGROUND OF THE INVENTION

1. Field of the Invention

The present invention relates to a streaking correction signal generating circuit, a streaking correction signal generating method, a program, a streaking correcting circuit, and an imaging device that are preferably applied to a solid-state imaging device including a CCD (charge-coupled device) image sensor or a CMOS (complementary metal oxide semiconductor) image sensor.

More specifically, the present invention relates to a streaking correction signal generating circuit and so on enabling real-time correction of streaking by detecting signal levels of respective lines of a horizontal light shield by using an output signal of the horizontal light shield of an image sensor, detecting a black level by using an output signal of a vertical light shield of the image sensor, and generating streaking correction signals of the respective lines by subtracting the black level from each of the signal levels of the respective lines of the horizontal light shield.

2. Description of the Related Art

As an imaging device, a solid-state imaging device including a CCD image sensor or a CMOS image sensor has been known. If an image of a high-brightness subject is captured by the solid-state imaging device, streaking occurs in the horizontal direction in the captured image.

For example, Patent Document 1 (Japanese Unexamined Patent Application Publication No. 2005-130331) describes a technique of performing streaking correction by correcting a difference in DC level of cases where a pixel portion is shielded from light and where the pixel portion receives light.

SUMMARY OF THE INVENTION

In the technique described in Patent Document 1, the light receiving unit is shielded in order to obtain a streaking correction signal, and thus it may be impossible to detect streaking in real time and to correct streaking in real time. Furthermore, shielding the light receiving unit frequently during shooting causes loss in exposure time, and thus video signals are obtained inefficiently.

The present invention is directed to enabling real-time correction of streaking.

According to an embodiment of the present invention, there is provided an imaging device including an image sensor including a horizontal light shield and a vertical light shield; a streaking correction signal generating circuit configured to generate streaking correction signals of respective lines based on an output signal of the image sensor; and a subtractor configured to subtract the streaking correction signal of a corresponding line generated by the streaking correction signal generating circuit from the output signal of each line of the image sensor so as to obtain streaking-corrected output signals. The streaking correction signal generating circuit includes a light-shield waveform detecting unit configured to detect signal levels of respective lines in the horizontal light shield by using an output signal of the horizontal light shield of the image sensor; a black level detecting unit configured to detect a black level by using an output signal of the vertical light shield of the image sensor; and a subtracting unit configured to subtract the black level detected by the black level detecting unit from each of the signal levels of the respective lines in the horizontal light shield detected by the light-shield waveform detecting unit so as to generate the streaking correction signals of the respective lines.

In the above-described configuration, the image sensor includes the horizontal light shield and the vertical light shield. In the streaking correction signal generating circuit, streaking correction signals of respective lines are generated based on output signals of the image sensor. That is, the light-shield waveform detecting unit detects the signal levels of the respective lines of the horizontal light shield by using the output signal of the horizontal light shield of the image sensor. The black level detecting unit detects the black level by using the output signal of the vertical light shield of the image sensor. The subtracting unit subtracts the black level from each of the signal levels of the respective lines of the horizontal light shield so as to generate the streaking correction signals of the respective lines.

The light-shield waveform detecting unit may include an average calculator configured to calculate averages of values of pixels constituting the horizontal light shield in units of lines; a digital filter configured to average the pixel averages of the respective lines calculated in the average calculator in a time direction; an $\epsilon$ filter applied in a vertical direction to the pixel averages of the respective lines output from the digital filter; and a median filter applied in the vertical direction to the pixel averages of the respective lines output from the $\epsilon$ filter. The signal levels of the respective lines in the horizontal light shield may be obtained from the median filter.

In this case, the average calculator and the digital filter reduce spatial random noise in the horizontal direction and temporal random noise. Also, the $\epsilon$ filter and the median filter reduce spatial random noise in the vertical direction and impulse noise.

The streaking correction signal generating circuit may further include a coring unit configured to perform a coring process on the streaking correction signals of the respective lines generated by the subtracting unit. By performing the coring process, minute noise can be removed while maintaining an edge component.

The streaking correction signal generating circuit may perform a process by adding a predetermined number of bits under the least significant bit of the output signal of the image sensor. In this case, streaking correction signals corresponding to a streaking component of a level under the least significant bit of the output signal of the image sensor can be generated.

The black level detecting unit may include an average calculator configured to calculate an average of values of pixels constituting the vertical light shield; and a digital filter configured to average the pixel average calculated by the average calculator in a time direction. The black level may be obtained from the digital filter. In this case, the average calculator and the digital filter reduce spatial and temporal random noise. The black level is detected from the values of respective pixels constituting the vertical light shield, so that the black level can be stably detected without being affected by a state of the light receiving unit.

As described above, the streaking correction signal generating circuit generates streaking correction signals by using only output signals of the light shields (horizontal and vertical light shields) of the image sensor. Therefore, the streaking correction signals can be obtained in real time without shielding the light receiving unit of the image sensor, so that streaking can be corrected in real time. In this case, there is no need to frequently shield the light receiving unit during shooting, so that efficiency of obtaining video signals does not decrease.

The subtracter subtracts the streaking correction signal of a corresponding line generated by the streaking correction signal generating circuit from the output signal of each line of the image sensor so as to obtain streaking-corrected output signals. The subtractor and the above-described streaking correction signal generating circuit constitute a streaking correcting circuit. The streaking correcting circuit performs real-time correction of streaking by using the streaking correction signals generated by the streaking correction signal generating circuit.

The streaking correcting circuit may further include a correction gain generating unit configured to generate a correction gain to the signal level of the output signal of the image sensor; and a multiplying unit configured to multiply the streaking correction signal generated by the streaking correction signal generating unit by the correction gain generated by the correction gain generating unit. The subtracter may subtract the streaking correction signal multiplied by the correction gain by the multiplying unit from the output signal of the image sensor. A streaking component in a pixel portion changes depending on a signal level. As described above, by multiplying the streaking correction signal by the correction gain according to the signal level, the accuracy of streaking correction can be enhanced.

The correction gain generating unit may include a signal level detecting unit configured to detect a level of the output signal of the image sensor; and a memory configured to output a correction gain corresponding to the level detected by the signal level detecting unit. In this case, a correction gain corresponding to the signal level can be obtained from the memory without any processing. Alternatively, the correction gain generating unit may include a signal level detecting unit configured to detect a level of the output signal of the image sensor; a memory configured to output correction gains on both ends of a level range including the level detected by the signal level detecting unit; and a processing unit configured to calculate a correction gain corresponding to the level detected by the signal level detecting unit based on the level detected by the signal level detecting unit and the correction gains on the both ends output from the memory. In this case, the capacity of the memory can be saved.

With the above-described configuration, signal levels of respective lines of the horizontal light shield are detected by using an output signal of the horizontal light shield of the image sensor and a black level is detected by using an output signal of the vertical light shield of the image sensor. By subtracting the black level from each of the signal levels of the respective lines of the horizontal light shield, streaking correction signals of the respective lines are generated. Accordingly, the streaking correction signals can be obtained in real time without shielding the light receiving unit of the image sensor, so that streaking can be corrected in real time.

DESCRIPTION OF THE PREFERRED EMBODIMENTS

Figure 1:
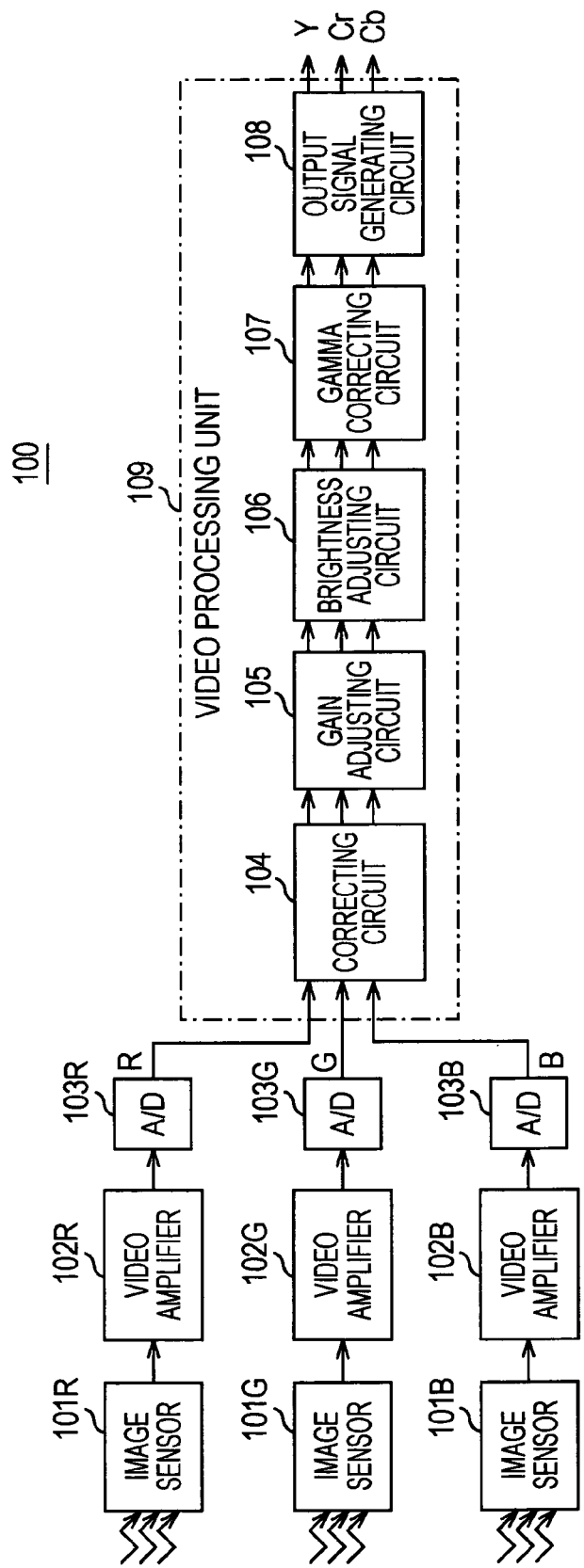
FIG. 1 is a block diagram illustrating an example of a configuration of an imaging device according to an embodiment of the present invention.

Hereinafter, an embodiment of the present invention is described with reference to the drawings. FIG. 1 illustrates an example of a configuration of an imaging device 100 according to an embodiment of the present invention. The imaging device 100 is a 3-CCD color imaging device. The imaging device 100 includes image sensors 101R, 101G, and 101B, video amplifiers 102R, 102G, and 102B, A/D converters 103R, 103G, and 103B, a correcting circuit 104, a gain adjusting circuit 105, a brightness adjusting circuit 106, a gamma correcting circuit 107, and an output signal generating circuit 108. The correcting circuit 104, the gain adjusting circuit 105, the brightness adjusting circuit 106, the gamma correcting circuit 107, and the output signal generating circuit 108 constitute a video processing unit 109.

The image sensors 101R, 101G, and 101B are used for red, green, and blue images, respectively. CCD or CMOS image sensors are used as the image sensors 101R, 101G, and 101B. The video amplifiers 102R, 102G, and 102B adjust red, green, and blue imaging signals output from the image sensors 101R, 101G, and 101B to an appropriate level. The A/D converters 103R, 103G, and 103B convert analog signals output from the video amplifiers 102R, 102G, and 102B to digital signals and output red data R, green data G, and blue data B, respectively.

The correcting circuit 104 performs streaking correction and defect correction on the red, green, and blue data R, G, and B output from the A/D converters 103R, 103G, and 103B. The gain adjusting circuit 105 adjusts the gain of the data of each color obtained in the correcting circuit 104 and performs white balance adjustment and color adjustment. The brightness adjusting circuit 106 performs brightness compression on the data of each color obtained in the gain adjusting circuit 105 so that video signals are within a predetermined range.

The gamma correcting circuit 107 performs gamma correction in accordance with monitor gamma of a CRT (cathode ray tube) or the like. The output signal generating circuit 108 converts the red, green, and blue data obtained in the gamma correcting circuit 107 to a final video output format and outputs the resulting signals. For example, the output signal generating circuit 108 includes a matrix circuit, converts the red, green, and blue data to a brightness signal Y, a red color-difference signal Cr, and a blue color-difference signal Cb, and outputs those signals.

Now, an operation of the imaging device 100 illustrated in FIG. 1 is briefly described. Red, green, and blue light beams from a subject obtained by an optical system (not shown) enter imaging planes of the image sensors 101R, 101G, and 101B, respectively, and red, green, and blue images are formed on the imaging planes. In the image sensors 101R, 101G, and 101B, an imaging process is performed under a state where the color images are formed on the imaging planes, so that color signals (imaging signals) of red, green, and blue corresponding to the subject are obtained.

The red, green, and blue signals obtained in the image sensors 101R, 101G, and 101B are adjusted to an appropriate level to be quantized in the video amplifiers 102R, 102G, and 102B and the A/D converters 103R, 103G, and 103B. Then, the red data R, the green data G, and the blue data B output from the A/D converters 103R, 103G, and 103B are supplied to the video processing unit 109.

In the video processing unit 109, the correcting circuit 104 and the gain adjusting circuit 105 perform a correcting process including streaking correction and defect correction and a gain adjusting process including white balance adjustment and color adjustment on the red data R, the green data G, and the blue data B. Furthermore, in the video processing unit 109, the brightness adjusting circuit 106 and the gamma correcting circuit 107 perform brightness compression and gamma correction on the data of each color output from the gain adjusting circuit 105. The data of each color obtained in the gamma correcting circuit 107 is supplied to the output signal generating circuit 108 and converted to video signals of a final output format (Y, Cr, and Cb). Then, those signals are output from the output signal generating circuit 108.

As described above, the correcting circuit 104 includes a streaking correcting circuit. The streaking correcting circuit may be included in one of the other circuits in the video processing unit 109. However, detecting a streaking component from gain-adjusted color data may cause false detection, which may have a bad effect on streaking correction. For this reason, it is most preferable to provide the streaking correcting circuit in the correcting circuit 104.

Figure 2:
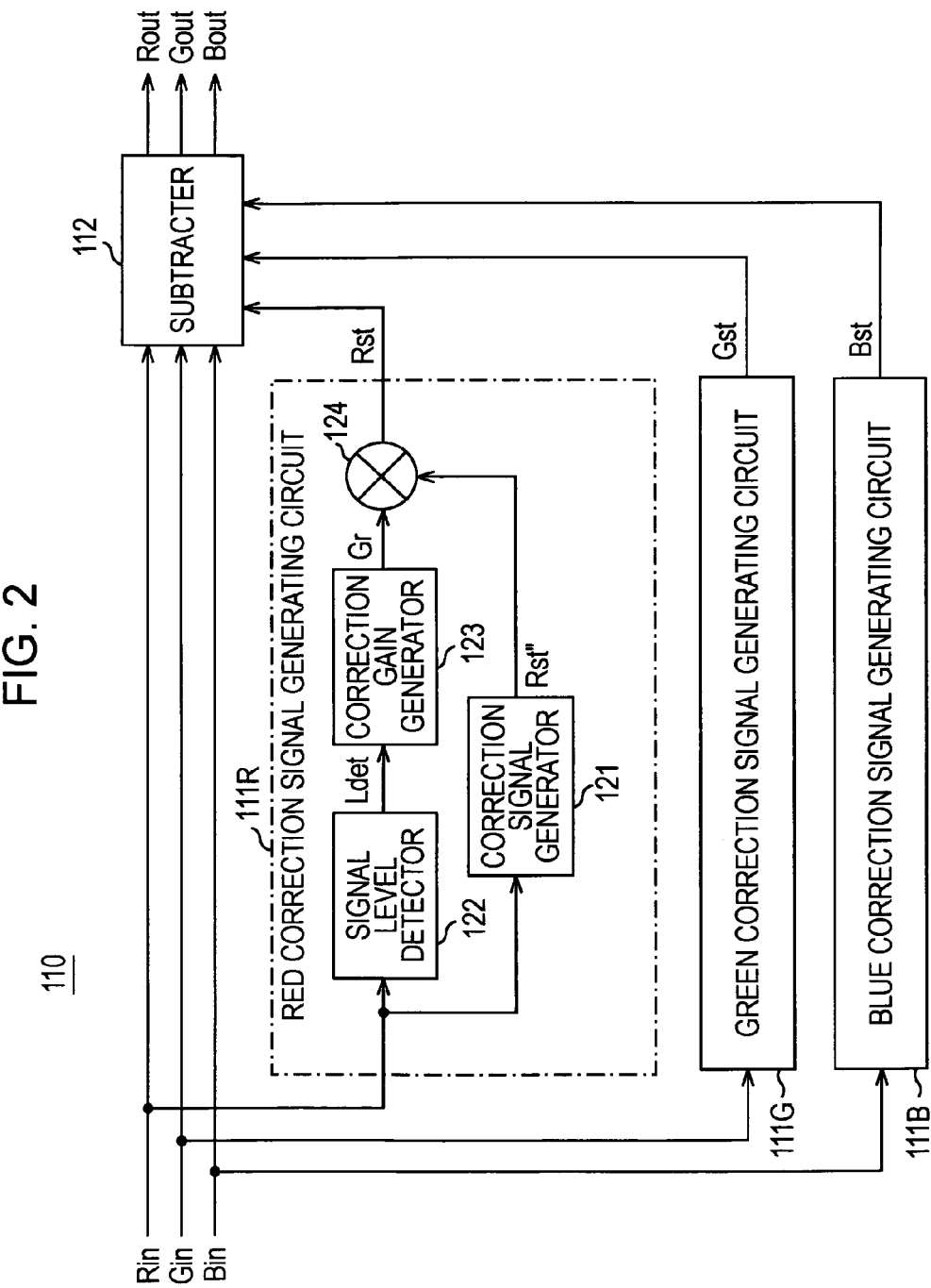
FIG. 2 is a block diagram illustrating an example of a configuration of a streaking correcting circuit.

FIG. 2 illustrates an example of a configuration of a streaking correcting circuit 110. In FIG. 2, the streaking correcting circuit 110 includes red, green, and blue correction signal generating circuits 111R, 111G, and 111B and a subtracter 112. The streaking correcting circuit 110 receives red data Rin, green data Gin, and blue data Bin as input, and outputs red data Rout, green data Gout, and blue data Bout on which streaking correction has been performed.

The red, green, and blue correction signal generating circuits 111R, 111G, and 111B generate streaking correction signals Rst, Gst, and Bst of respective lines of red, green, and blue based on the color data Rin, Gin, and Bin input thereto. The subtracter 112 subtracts the streaking correction signals Rst, Gst, and Bst of the respective lines of red, green, and blue generated in the correction signal generating circuits 111R, 111G, and 111B from the color data Rin, Gin, and Bin of the respective lines, and then outputs red data Rout, green data Gout, and blue data Bout on which streaking correction has been performed.

Now, an operation of the streaking correcting circuit 110 illustrated in FIG. 2 is described. The red data Rin, the green data Gin, and the blue data Bin input thereto are supplied to the red, green, and blue correction signal generating circuits 111R, 111G, and 111B, respectively. The color data Rin, Gin, and Bin are also supplied to the subtracter 112. The red, green, and blue correction signal generating circuits 111R, 111G, and 111B process the color data Rin, Gin, and Bin so as to generate the streaking correction signals Rst, Gst, and Bst of the respective lines of red, green, and blue.

The red, green, and blue streaking correction signals Rst, Gst, and Bst generated in the red, green, and blue correction signal generating circuits 111R, 111G, and 111B are supplied to the subtracter 112. The subtracter 112 subtracts the streaking correction signals Rst, Gst, and Bst of the respective lines of red, green, and blue from the color data Rin, Gin, and Bin of the respective lines of red, green, and blue. Accordingly, the red data Rout, the green data Gout, and the blue data Bout on which streaking correction has been performed can be obtained.

An example of a specific configuration of the red, green, and blue correction signal generating circuits 111R, 111G, and 111B is described. All of the red, green, and blue correction signal generating circuits 111R, 111G, and 111B have the same configuration, and thus the configuration of the red correction signal generating circuit 111R is described as representative. As illustrated in FIG. 2, the red correction signal generating circuit 111R includes a correction signal generator 121, a signal level detector 122, a correction gain generator 123, and a multiplier 124.

The correction signal generator 121 generates streaking correction signals Rst of respective lines based on the input red data Rin. The correction signal generator 121 generates the streaking correction signals Rst" of the respective lines by using output signals from a horizontal light shield (HOPB: horizontal optical black) and a vertical light shield (VOPB: vertical optical black) of the image sensor 101R.

Figure 3A:
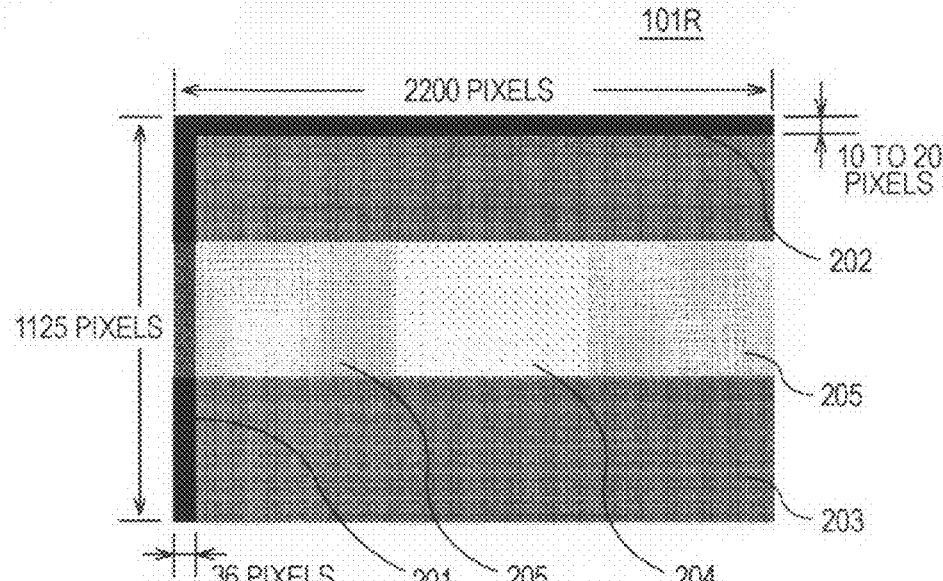
FIGS. 3A and 3B illustrate a configuration of an image sensor and streaking.

FIG. 3A illustrates a configuration of the image sensor 101R and an example of streaking occurred. The image sensor 101R includes, for example, 2200 pixels in the horizontal direction and 1125 pixels in the vertical direction (1125 lines). Also, the image sensor 101R includes a horizontal light shield (HOPB) 201 of 36 pixels in the horizontal direction, a vertical light shield (VOPB) 202 of 10 to 20 pixels in the vertical direction, and a light receiving unit 203. If the image sensor 101R performs imaging of a high-brightness subject, e.g., a light source 204, streaking 205 occurs in the horizontal direction.

Figure 4:
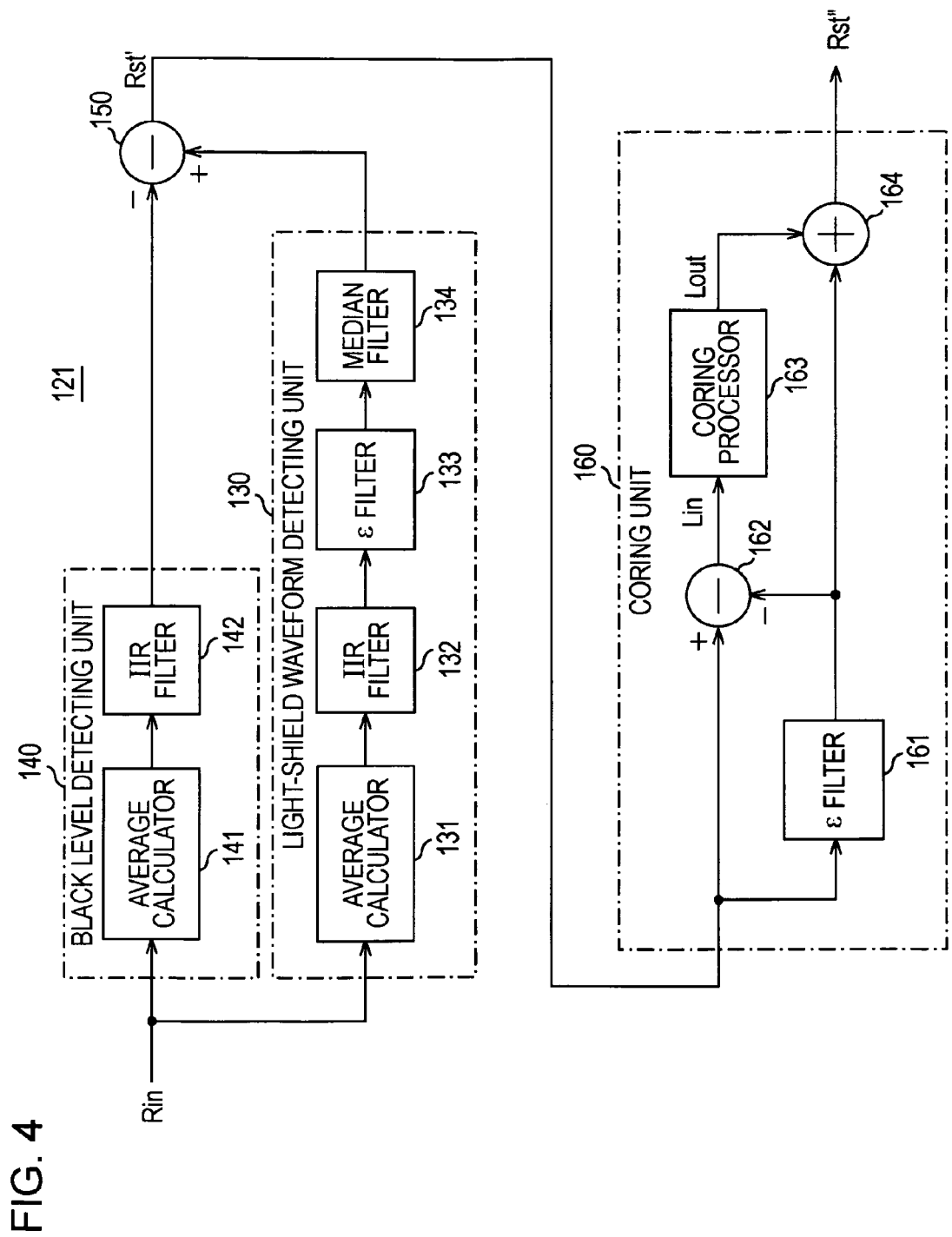
FIG. 4 is a block diagram illustrating an example of a configuration of a correction signal generator.

FIG. 4 illustrates an example of a configuration of the correction signal generator 121. The correction signal generator 121 includes a light-shield waveform detecting unit 130, a black level detecting unit 140, a subtracter 150, and a coring unit 160.

Figure 3B:
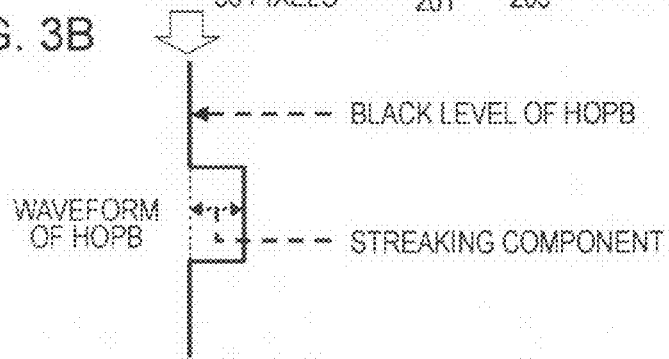

The light-shield waveform detecting unit 130 detects a waveform of the horizontal light shield 201 as illustrated in FIG. 3B, that is, signal levels of respective lines in the horizontal light shield 201, by using an output signal of the horizontal light shield 201 of the image sensor 101R. The light-shield waveform detecting unit 130 includes, as illustrated in FIG. 4, an average calculator 131, an IIR (infinite impulse response) filter 132 as a digital filter, an ε (epsilon) filter 133, and a median filter 134, which are connected in this order.

The average calculator 131 calculates averages of values of pixels constituting the horizontal light shield 201 in units of lines. The average calculator 131 enables reduction in spatial random noise in the horizontal direction.

The IIR filter 132 averages the pixel averages of the respective lines calculated in the average calculator 131 in a time direction. The IIR filter 132 uses an input signal of a present frame and an output signal of a previous frame by a feedback loop. The IIR filter 132 enables reduction in temporal random noise. Alternatively, another type of digital filter, such as a FIR (finite impulse response) filter, can be used instead of the IIR filter 132.

Figure 5:
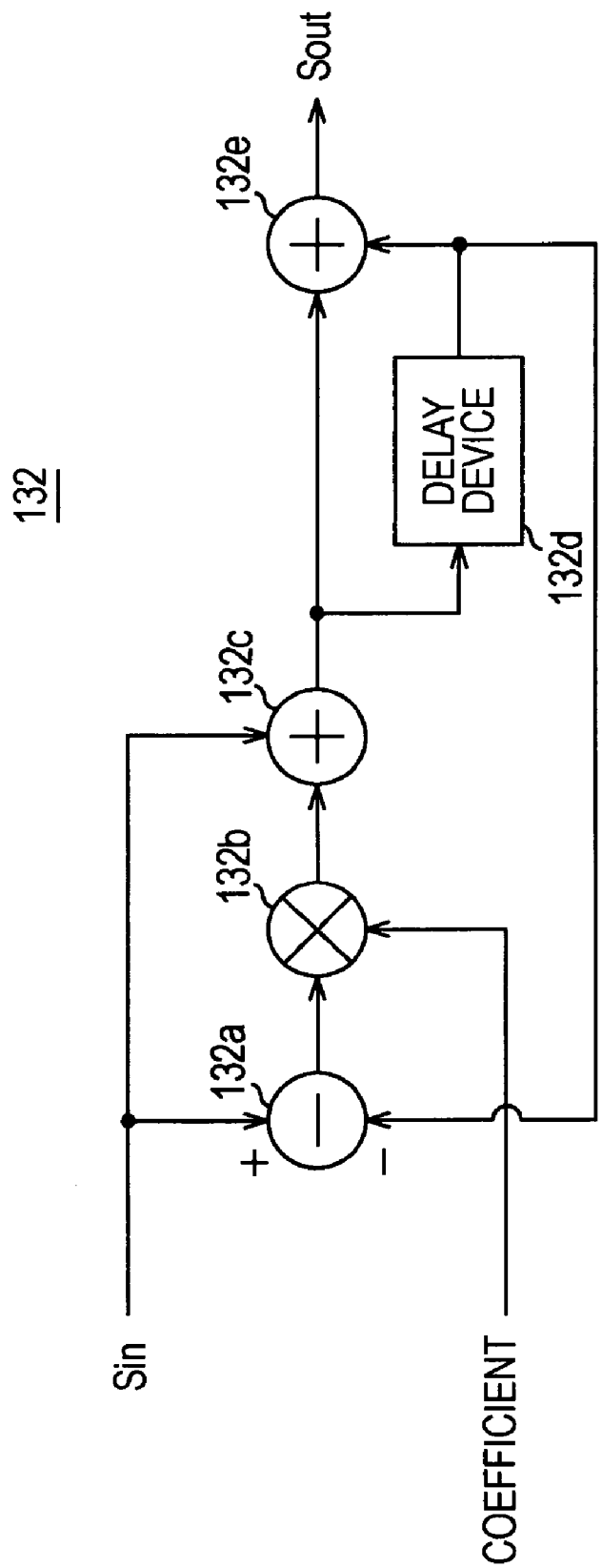
FIG. 5 is a block diagram illustrating an example of a configuration of an IIR filter.

FIG. 5 illustrates an example of a configuration of the IIR filter 132. In FIG. 5, the IIR filter 132 includes a subtracter 132a, a multiplier 132b, adders 132c and 132e, and a delay device 132d. An input signal Sin is supplied to the subtracter 132a and the adder 132c. An output signal of the subtracter 132a is supplied to the multiplier 132b, which multiplies the output signal by a coefficient. The coefficient determines the number of previous frames of which output signal can be used. An output signal of the multiplier 132b is supplied to the adder 132c, which adds the output signal to the above-described input signal Sin.

An output signal of the adder 132c is supplied to the adder 132e and the delay device 132d. The delay device 132d has delay time of one frame. An output signal of the delay device 132d is added to the above-described output signal of the adder 132c in the adder 132e, so that an output signal Sout is obtained. Also, the output signal of the delay device 132d is supplied to the subtracter 132a, which subtracts the output signal from the input signal Sin.

The above-described IIR filter 132 enables reduction in temporal random noise. Alternatively, another type of digital filter, such as a FIR (finite impulse response) filter, can be used instead of the IIR filter 132.

The ϵ filter 133 is a nonlinear filter to remove small-amplitude noise. The ϵ filter 133 is applied in the vertical direction to the pixel averages of the respective lines output from the IIR filter 132. The ϵ filter 133 enables reduction in random noise in the vertical direction.

Figure 6:
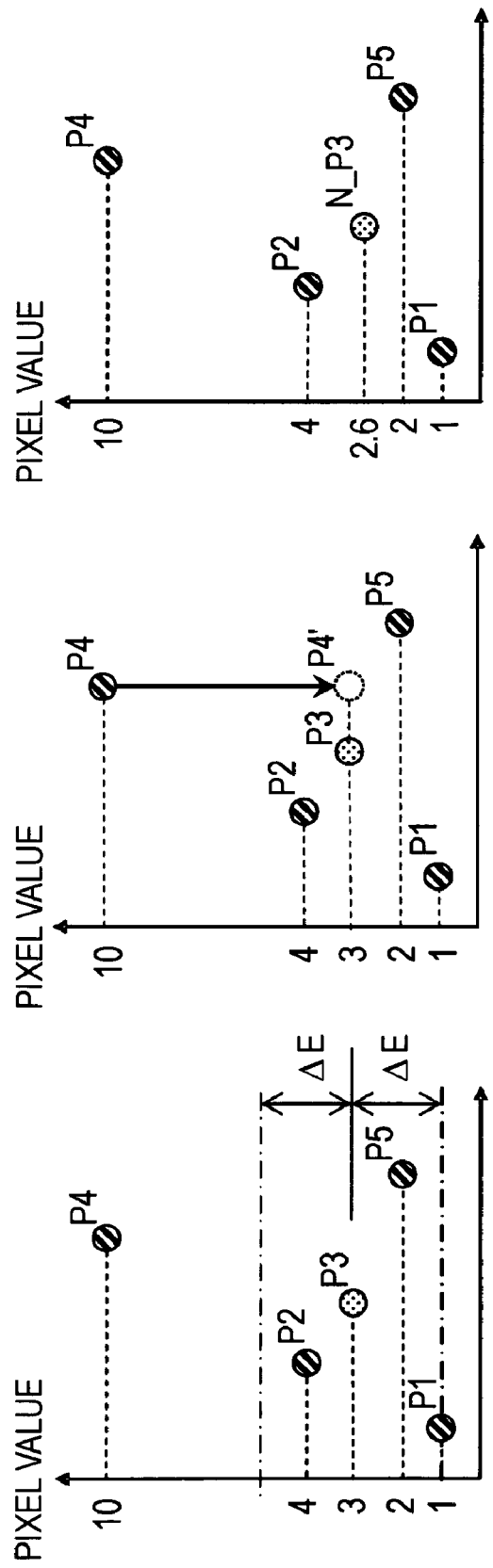
FIGS. 6A to 6C illustrate an operation of an $\epsilon$ filter.

Now, an overview of the ϵ filter 133 is described. Referring to FIG. 6A, a case where a filter having a filter length of 5 (a filter coefficient is 1 in any case) is applied to a signal (pixel average) P3 is assumed. Among signals P1, P2, P4, and P5 around the signal P3 as a target of filtering, the signals P4 and P3 have a difference equal to or larger than a threshold ΔE. Thus, the filter is applied by replacing the signal P4 by a signal P4', having the same value as that of the signal P3, as illustrated in FIG. 6B.

That is, as illustrated in FIG. 6C, N_P3=(P1+P2+P3+P4' (=P3)+P5)/5=(1+4+3+3+2)/5=2.6 is satisfied.

Figure 7:
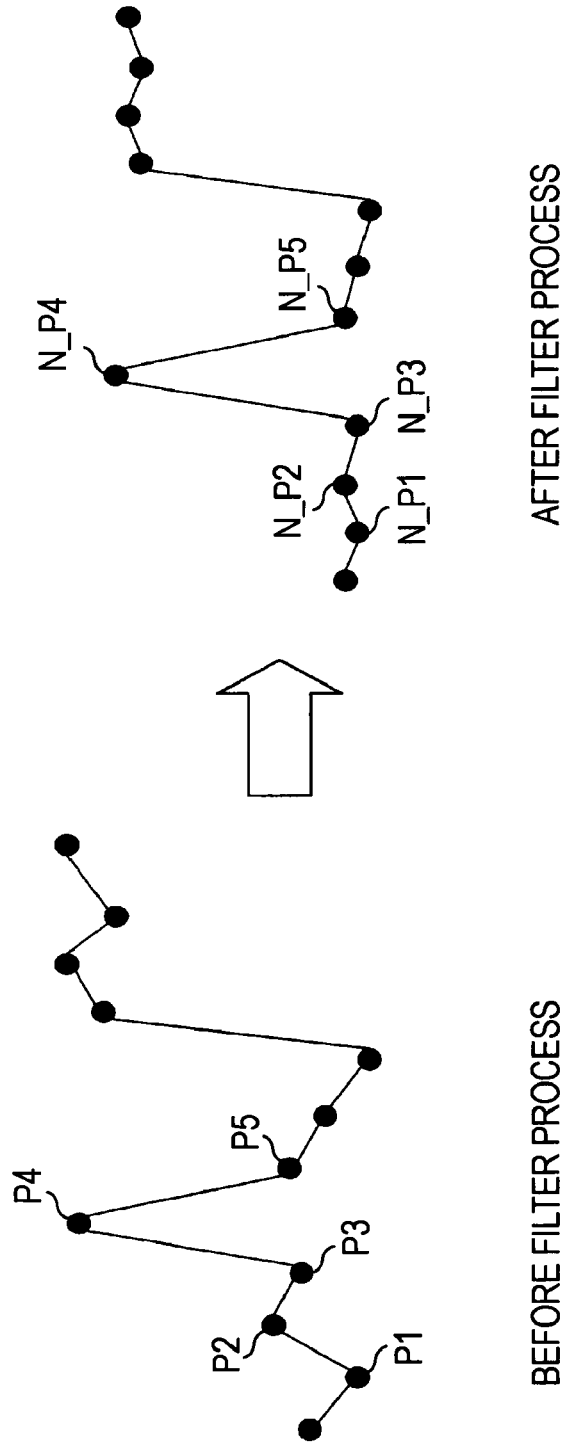
FIG. 7 illustrates an application example of the $\epsilon$ filter.

By applying the above-described filter, the signals P1, P2, P3, P4, P5 . . . before process change to signals N_P1, N_P2, N_P3, N_P4, N_P5 . . . after process, as illustrated in FIG. 7, and variations can be suppressed in a part where the value does not sharply change. That is, the ϵ filter 133 enables reduction in spatial random noise in the vertical direction.

The median filter 134 is applied in the vertical direction to the pixel averages of the respective lines output from the ϵ filter 133. The median filter 134 sorts an odd number of values including a target signal in the order of values and selects a median value. By using the median filter 134, impulse noise (e.g., the signal N_P4 in FIG. 7) is removed. The signal levels of the respective lines in the above-described horizontal light shield 201 (the waveform of the horizontal light shield 201) can be obtained from the median filter 134.

Although not shown in the drawings, the coefficient of the IIR filter 132 and the threshold ΔE of the ϵ filter 133 can be externally adjusted in view of a trade-off between a real-time characteristic and denoising. For example, when the amount of noise is small, only a spatial filter may be used by placing importance on the real-time characteristic. In this way, the circuit configuration can be changed depending on the amount of noise.

Referring back to FIG. 4, the black level detecting unit 140 detects a black level by using an output signal of the vertical light shield 202 of the image sensor 101R. As illustrated in FIG. 3A, streaking is superimposed on the horizontal light shield 201 during shooting, and thus it may be impossible to accurately detect a black level from an output signal of the horizontal light shield 201. For this reason, the black level detecting unit 140 detects a black level by using an output signal of the vertical light shield 202, as described above.

As illustrated in FIG. 4, the black level detecting unit 140 includes an average calculator 141 and an IIR filter 142 as a digital filter, which are connected in this order. In the black level detecting unit 140, the IIR filter 142 is applied in a time axis direction so that the real-time characteristic can be maintained while an effect of noise is minimized.

The average calculator 141 calculates an average of values of pixels constituting the vertical light shield 202. The average calculator 141 enables reduction in spatial random noise in the horizontal and vertical directions.

The IIR filter 142 averages the pixel average calculated in the average calculator 141 in a time direction. The IIR filter 142 uses an input signal of a present frame and an output signal of a previous frame by a feedback loop. (see FIG. 5). The IIR filter 142 enables reduction in temporal random noise. Alternatively, another type of digital filter, such as a FIR (finite impulse response) filter, can be used instead of the IIR filter 142. The above-described black level can be obtained from the IIR filter 142.

The subtracter 150 subtracts the black level detected in the black level detecting unit 140 from each of the signal levels of the respective lines in the horizontal light shield 201 obtained in the light-shield waveform detecting unit 130, so as to obtain streaking correction signals Rst' of the respective lines, that is, streaking components of the respective lines (see FIG. 3B).

The coring unit 160 performs a coring process on the streaking correction signals Rst' of the respective lines obtained from the subtracter 150 and outputs final streaking correction signals Rst" of the respective lines. The coring unit 160 includes an ϵ filter 161, a subtracter 162, a coring processor 163, and an adder 164.

The ϵ filter 161 is a nonlinear filter to remove small-amplitude noise. The ϵ filter 161 has the same configuration as that of the above-described ϵ filter 133 of the light-shield waveform detecting unit 130 (see FIGS. 6A to 6C and 7). The ϵ filter 161 is applied in the vertical direction to the streaking correction signals Rst' of the respective lines output from the subtracter 150.

The subtracter 162 subtracts a corresponding signal generated in the ϵ filter 161 from each of the streaking correction signals of the respective lines obtained in the subtracter 150, so as to extract high-frequency components Lin. For example, the signal that is subtracted from the streaking correction signal of one of the lines is generated in the ϵ filter 161 by using the streaking correction signal of the line and the streaking correction signals of predetermined lines before and after the line.

The coring processor 163 performs a coring process on the high-frequency components Lin of the respective lines obtained in the subtracter 162. More specifically, the coring processor 163 compares the absolute value of each input signal Lin with a preset coring level. If the absolute value of the input signal Lin is higher than the coring level, the input signal Lin is used as is as an output signal Lout. On the other hand, if the coring level is higher than the absolute value of the input signal Lin, an output signal Lout is set to 0. That is, in the coring process performed in the coring processor 163, a component of a relatively high signal level, such as an edge, is maintained, and the other component of a low signal level is removed.

Figure 8:
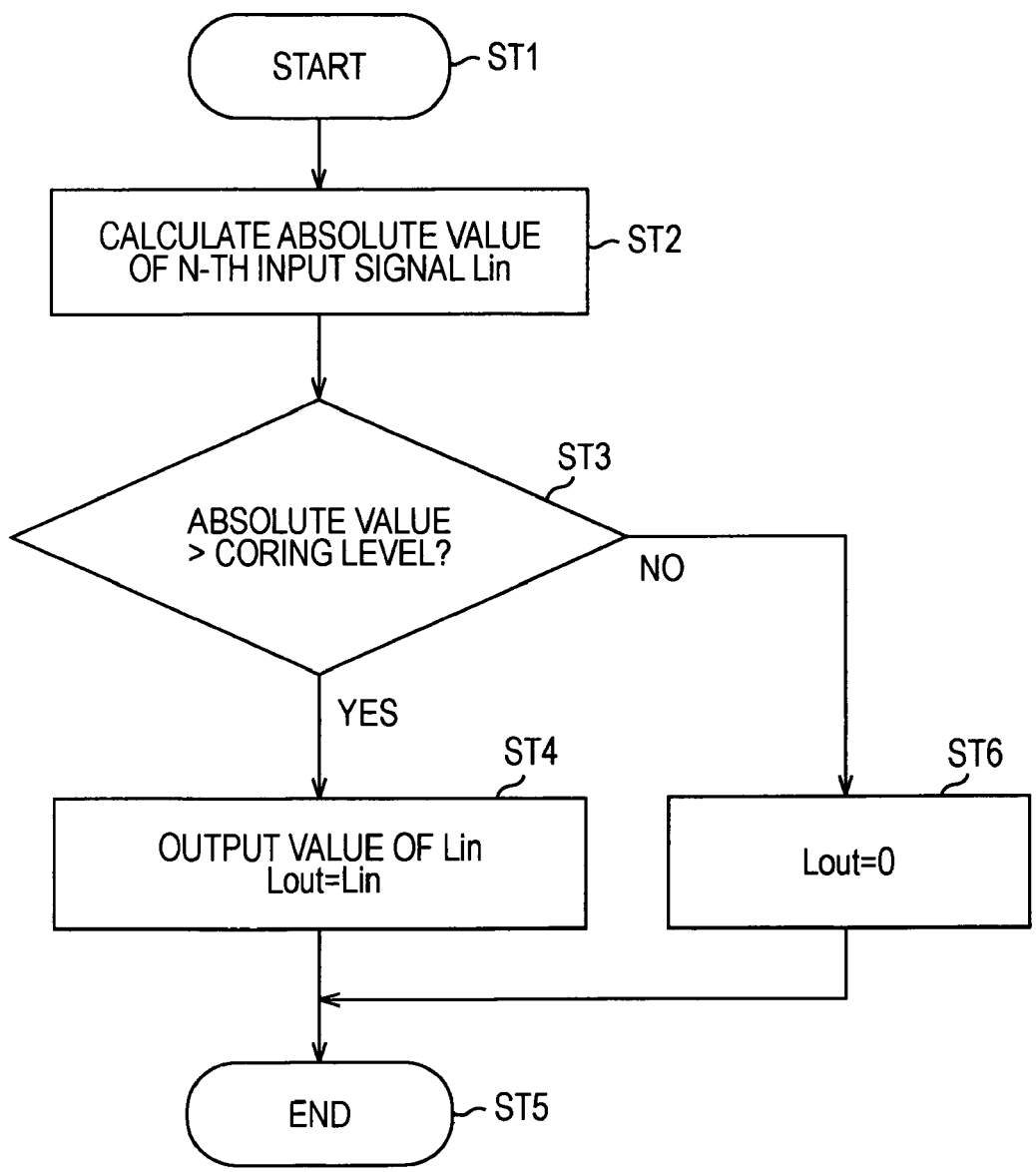
FIG. 8 is a flowchart illustrating a procedure of a coring process performed in a coring processor.

The flowchart in FIG. 8 illustrates a procedure of a coring process corresponding to an N-th line, performed in the coring processor 163.

First, the coring processor 163 starts the process in step ST1, and the process proceeds to step ST2. In step ST2, the coring processor 163 calculates the absolute value of the N-th input signal Lin. Then, the coring processor 163 determines in step ST3 whether the absolute value obtained in step ST2 is higher than the coring level. If the absolute value is higher than the coring level, the process proceeds to step ST4, where the coring processor 163 outputs the input signal Lin as is as the output signal Lout. Then, the process ends in step ST5. On the other hand, if the absolute value is not higher than the coring level, the process proceeds to step ST6, where the coring processor 163 outputs 0 as the output signal Lout. Then, the process ends in step ST5.

The adder 164 adds the output signals Lout from the coring processor 163 to the signals of the respective lines output from the $\epsilon$ filter 161, so as to add the high-frequency components that have been removed by the $\epsilon$ filter 161. The signals of the respective lines output from the adder 164 serve as the final streaking correction signals Rst" of the respective lines. In the coring unit 160, minute noise can be removed while maintaining edge components by adjusting the coring level in the coring processor 163.

Figure 9:
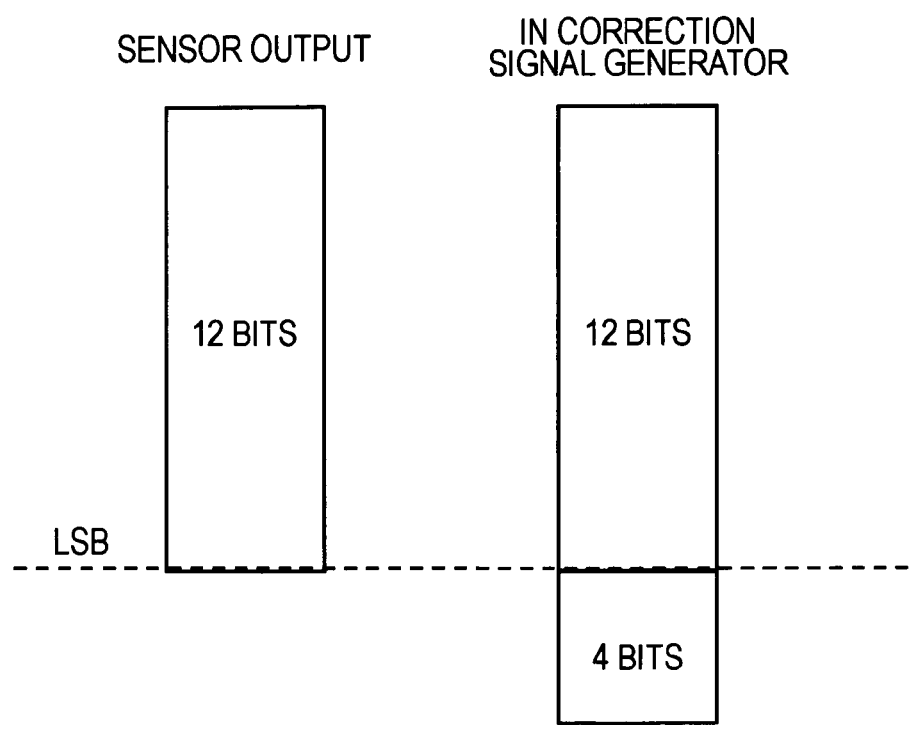
FIG. 9 illustrates a comparison between a bit configuration of an output signal of the image sensor and a bit configuration in the correction signal generator.

In the above-described correction signal generator 121 including the light-shield waveform detecting unit 130, the black level detecting unit 140, the subtracter 150, and the coring unit 160, a process is performed by providing a predetermined number of bits under the least significant bit (LSB) of the output signal of the image sensor 101R, that is, the red data Rin obtained in the A/D converter 103R. For example, as illustrated in FIG. 9, if the output signal of the image sensor 101R includes 12 bits, a process is performed in the correction signal generator 121 by adding four bits under the LSB of the output signal of the image sensor 101R. Accordingly, in the correction signal generator 121, discarding of a component under the LSB generated in the IIR filter processing or the like can be avoided, and streaking correction signals corresponding to a streaking component of a level under the LSB can be generated.

Now, an operation of the correction signal generator 121 illustrated in FIG. 4 is described.

An output signal Rin of the image sensor 101R is supplied to the average calculator 131 of the light-shield waveform detecting unit 130. The average calculator 131 calculates averages of values of pixels constituting the horizontal light shield 201 of the image sensor 101R in units of lines. The pixel averages of the respective lines calculated in the average calculator 131 pass through the IIR filter 132, the $\epsilon$ filter 133, and the median filter 134. The signal levels of the respective lines in the horizontal light shield 201 (the waveform of the horizontal light shield 201) in which temporal and spatial random noise has been reduced and impulse noise has been removed can be obtained from the median filter 134 as output of the light-shield waveform detecting unit 130.

Also, the output signal Rin of the image sensor 101R is supplied to the average calculator 141 of the black level detecting unit 140. The average calculator 141 calculates an average of values of pixels constituting the vertical light shield 202 of the image sensor 101R. The black level calculated in the average calculator 141 passes through the IIR filter 142. The black level in which temporal and spatial noise has been reduced can be obtained from the IIR filter 142 as output of the black level detecting unit 140.

The signal levels of the respective lines in the horizontal light shield 201 detected in the light-shield waveform detecting unit 130 are supplied to the subtracter 150. The black level detected in the black level detecting unit 140 is also supplied to the subtracter 150. The subtracter 150 subtracts the black level from each of the signal levels of the respective lines in the horizontal light shield 201, so that the streaking correction signals of the respective lines (streaking components of the respective lines) Rst' can be obtained.

The streaking correction signals Rst' of the respective lines obtained in the subtracter 150 are supplied to the coring unit 160. That is, the streaking correction signals Rst' of the respective lines are supplied to the $\epsilon$ filter 161 and the subtracter 162. In the $\epsilon$ filter 161, a high-frequency component is removed from each of the streaking correction signals Rst' of the respective lines, and resulting signals are output therefrom. The signals output from the $\epsilon$ filter 161 are supplied to the subtractor 162 and the adder 164.

The subtracter 162 subtracts the corresponding output signal of the $\epsilon$ filter 161 from each of the streaking correction signals Rst' of the respective lines, so as to extract high-frequency components Lin. The high-frequency components Lin are supplied to the coring processor 163. The coring processor 163 compares the absolute value of each input signal Lin with a preset coring level. If the absolute value of the input signal Lin is higher than the coring level, the input signal Lin is output as is as an output signal Lout. On the other hand, if the coring level is higher than the absolute value of the input signal Lin, the output signal Lout is set to 0.

The output signals Lout of the coring processor 163 are supplied to the adder 164. The adder 164 adds the output signals Lout from the coring processor 163 to the signals of the respective lines output from the $\epsilon$ filter 161, so that the high-frequency components that have been removed by the filter 161 are added again. Accordingly, the final streaking correction signals Rst" of the respective lines having edge components, minute noise having been removed therefrom, can be obtained from the adder 164 as output of the coring unit 160 and as output of the correction signal generator 121.

Figure 10:
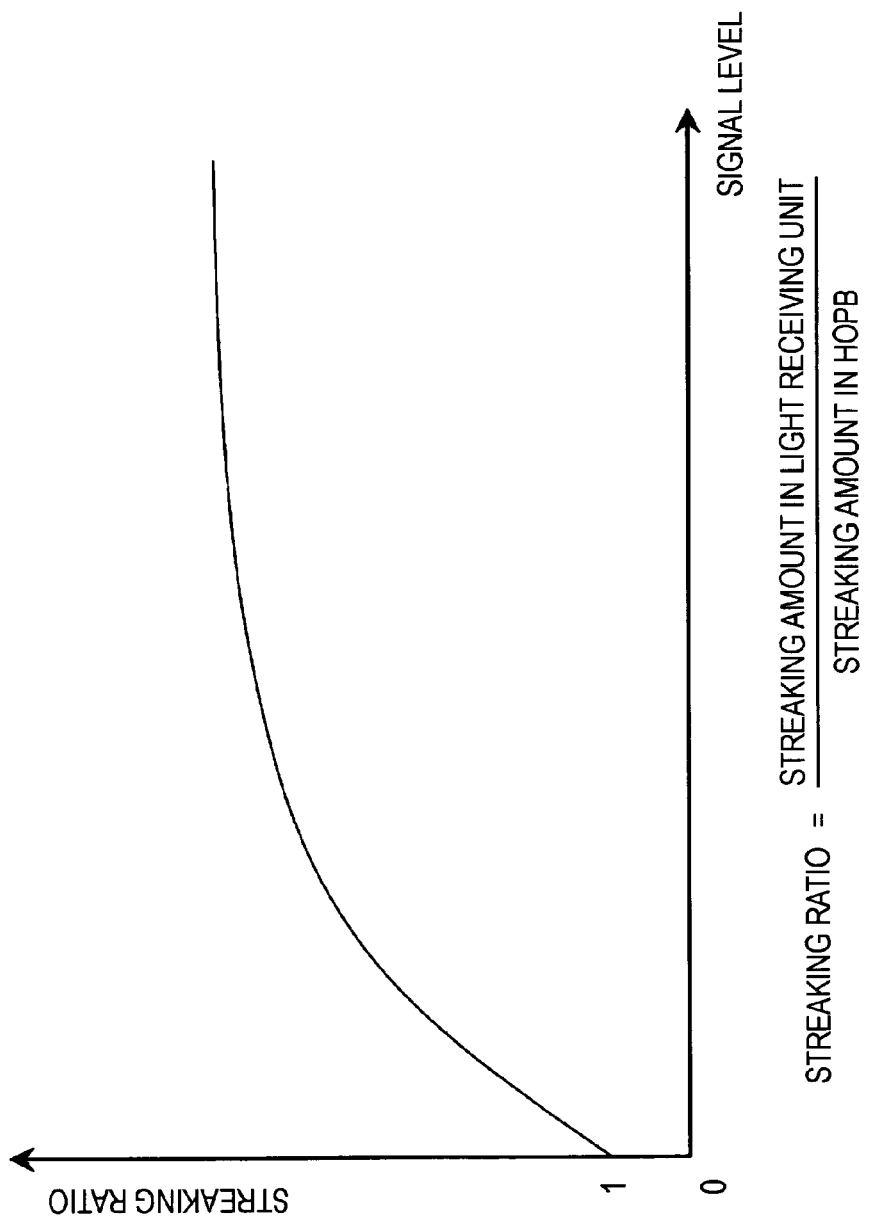
FIG. 10 illustrates an example of the relationship between a signal level and a streaking ratio (streaking amount in a light receiving unit/streaking amount in HOPB)

Referring back to FIG. 2, the signal level detector 122 and the correction gain generator 123 constitute a correction gain generating unit. In a streaking component, the level thereof detected in the horizontal light shield 201 and the level thereof detected in the light receiving unit 203 do not necessarily match depending on the level (signal level) of the red data Rin and change in temperature. FIG. 10 illustrates an example of the relationship between a level ratio (streaking ratio) of a streaking amount detected in the light receiving unit 203 and a streaking amount detected in the horizontal light shield 201 and the signal level.

In the red correction signal generating circuit 111R, a streaking correction signal Rst is obtained by multiplying the streaking correction signal Rst" generated in the above-described correction signal generator 121 by a correction gain Gr generated by the signal level detector 122 and the correction gain generator 123.

The signal level detector 122 detects the level of the input red data Rin (the signal level Ldet) in units of pixels. In the signal level detector 122, the signal level Ldet can be accurately detected while suppressing an effect of an impulse signal by applying an $\epsilon$ filter to the target pixel and horizontally adjoining pixels. The correction gain generator 123 generates a correction gain Gr in accordance with the signal level Ldet detected in the signal level detector 122.

Figure 11A:
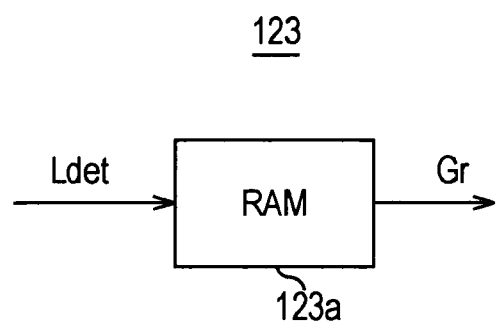
FIGS. 11A and 11B are block diagrams illustrating examples of a configuration of a correction gain generator.

For example, as illustrated in FIG. 11A, the correction gain generator 123 includes a memory 123a containing a lookup table. In this case, the memory 123a stores correction gains (streaking ratios) corresponding to the respective signal levels. When a signal level Ldet is input to the memory 123a, the correction gain Gr corresponding to the signal level Ldet is read and output from the memory 123a. In this way, when the correction gain generator 123 includes only the memory 123a, a correction gain can be easily obtained without any processing.

Figure 11B:
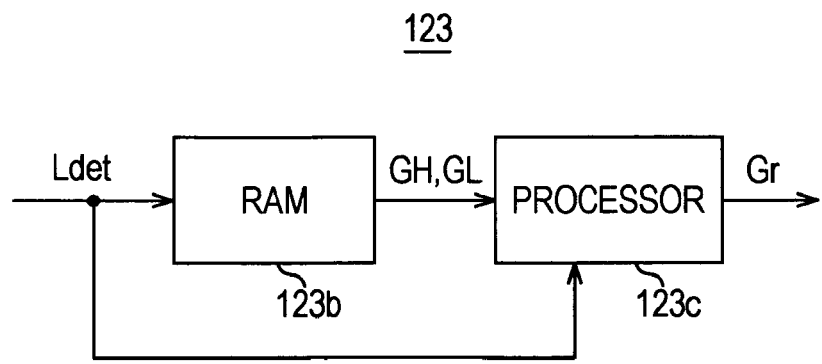
Figure 12:
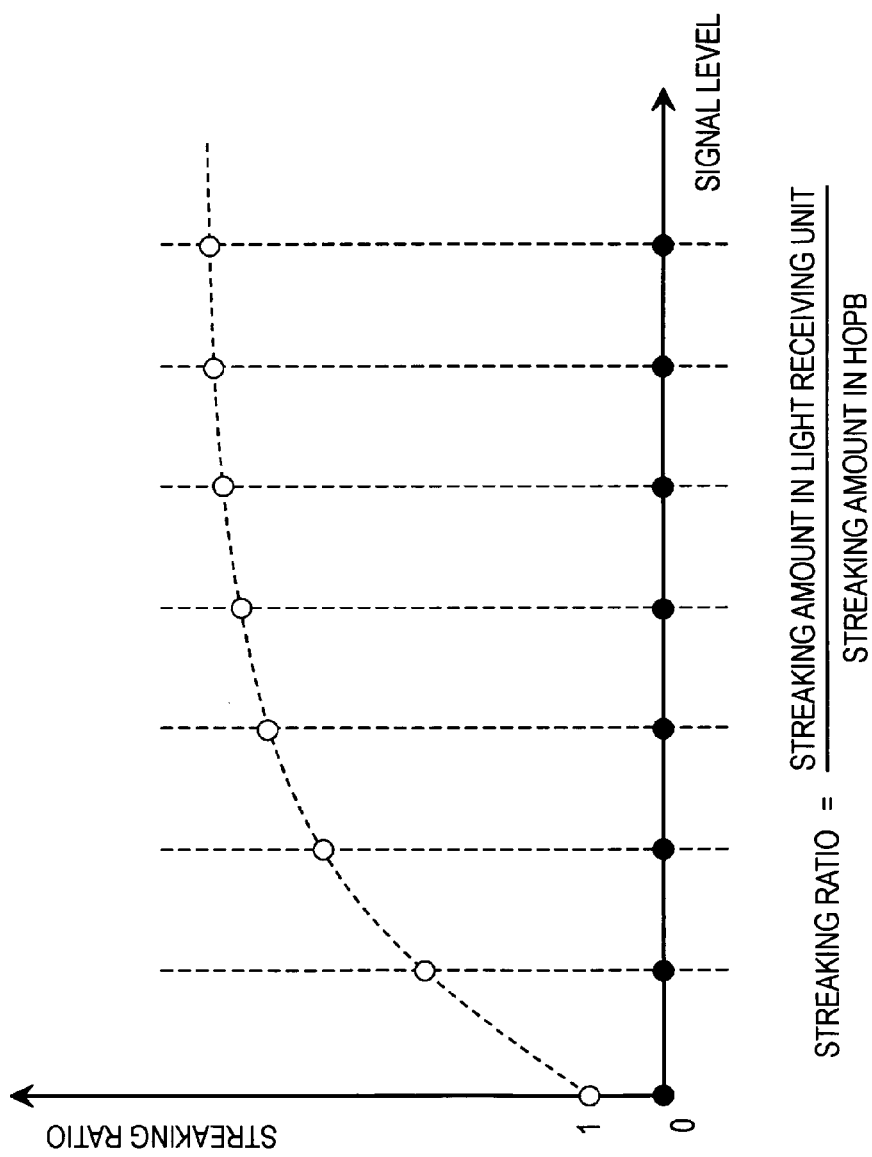
FIG. 12 illustrates an example of the relationship between discrete signal levels and streaking ratios (streaking amount in the light receiving unit/streaking amount in HOPB)

Alternatively, as illustrated in FIG. 11B, the correction gain generator 123 includes a memory 123b containing a lookup table and a processor 123c. In this case, the memory 123b stores correction gains (streaking ratios) as indicated by white circles in FIG. 12, corresponding to discrete signal levels as indicated by black circles in FIG. 12. When a signal level Ldet is input to the memory 123b, correction gains GL and GH on both ends of a level range including the signal level Ldet are read and output from the memory 123b. The processor 123c performs linear interpolation by using the correction gains GL and GH from the memory 123b and the signal level Ldet, so that a correction gain Gr corresponding to the signal level Ldet is generated and is output therefrom. In this way, when the correction gain generator 123 includes the memory 123b and the processor 123c, the capacity of the memory 123b can be saved.

The multiplier 124 multiplies the streaking correction signals Rst" generated in the correction signal generator 121 by the correction gains (streaking ratios) Gr corresponding to the respective signal levels obtained in the correction gain generator 123, so as to generate streaking correction signals Rst as output of the red correction signal generating circuit 111R.

Now, an operation of the red correction signal generating circuit 111R illustrated in FIG. 2 is described.

The red data Rin serving as an output signal of the image sensor 101R is supplied to the correction signal generator 121. The correction signal generator 121 generates streaking correction signals Rst" of the respective lines by using output signals of the horizontal light shield 201 and the vertical light shield 202. The streaking correction signals Rst" are supplied to the multiplier 124.

The red date Rin as an output signal of the image sensor 101R is also supplied to the signal level detector 122. The signal level detector 122 detects the level of the input red data Rin (the signal level Ldet) in units of pixels. The signal levels Ldet detected in the signal level detector 122 are supplied to the correction gain generator 123. The correction gain generator 123 generates correction gains Gr corresponding to the respective signal levels Ldet. The correction gains Gr are supplied to the multiplier 124.

The multiplier 124 multiplies each of the streaking correction signals Rst" generated in the correction signal generator 121 by the correction gain (streaking ratio) Gr corresponding to the signal level Ldet obtained in the correction gain generator 123, so as to generate the streaking correction signals Rst as output of the red correction signal generating circuit 111R.

Figure 13:
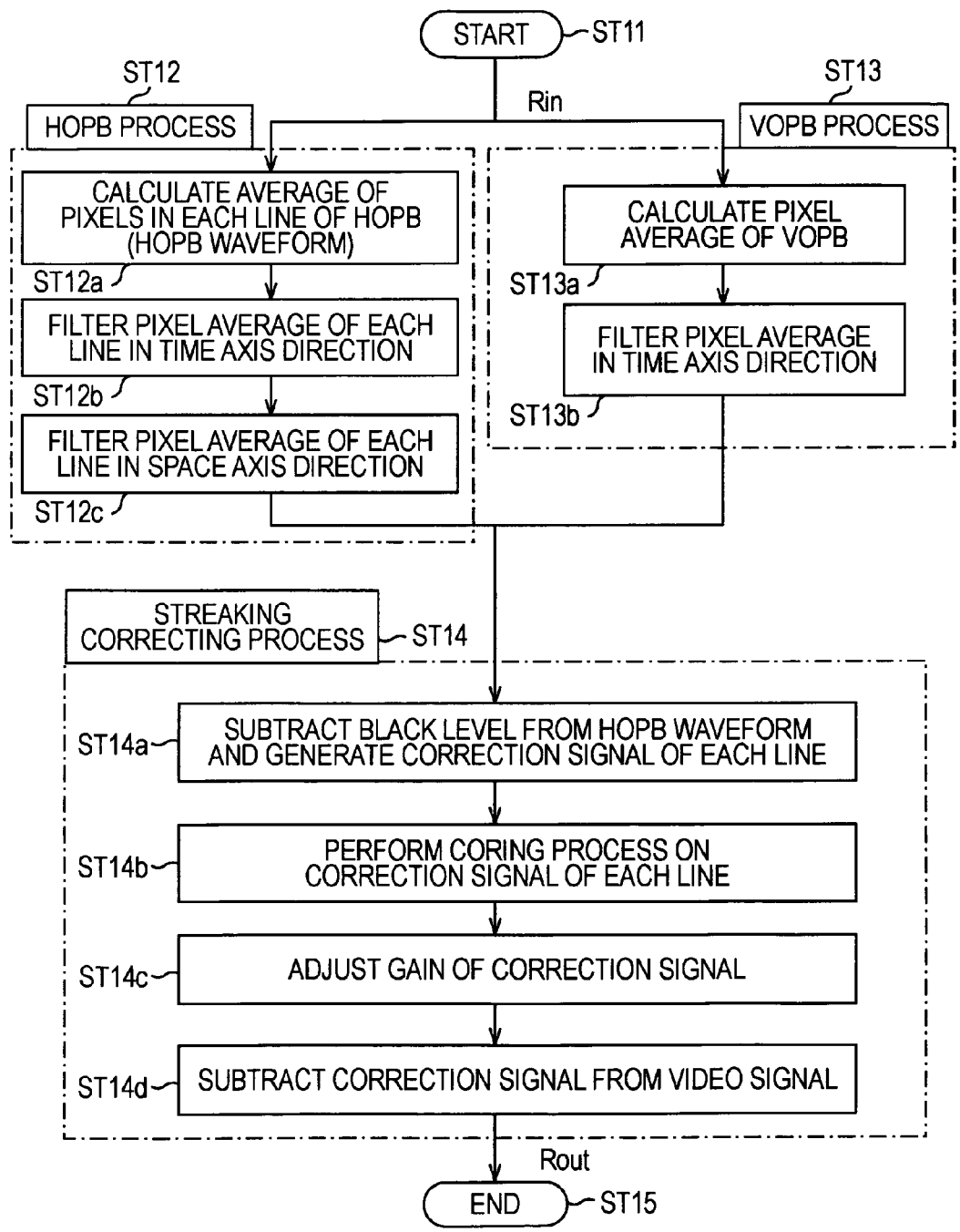
FIG. 13 is a flowchart illustrating a procedure of a streaking correcting process performed in the streaking correcting circuit.

The flowchart in FIG. 13 illustrates a procedure of the streaking correcting process performed in the streaking correcting circuit 110 illustrated in FIG. 2.

The streaking correcting circuit 110 starts the process in step ST11, and the process proceeds to steps ST12 and ST13.

In step ST12, the streaking correcting circuit 110 detects the waveform of the horizontal light shield 201, that is, the signal levels of the respective lines in the horizontal light shield 201, by using an output signal of the horizontal light shield 201 of the image sensor 101R.

Step ST12 includes steps ST12a to ST12c. In step ST12a, the streaking correcting circuit 110 calculates averages of values of the pixels constituting the horizontal light shield 201 in units of lines, so as to reduce random noise in the horizontal direction (the average calculator 131 of the light-shield waveform detecting unit 130). Then, in step ST12b, the streaking correcting circuit 110 performs filtering in a time axis direction on the averages of the respective lines, so as to reduce random noise in the time direction (the IIR filter 132 of the light-shield waveform detecting unit 130). Furthermore, in step ST12c, the streaking correcting circuit 110 performs filtering in a space axis direction on the averages of the respective lines, so as to reduce special random noise in the vertical direction and remove impulse noise (the $\epsilon$ filter 133 and the media filter 134 of the light-shield waveform detecting unit 130).

Also, the streaking correcting circuit 110 detects a black level by using an output signal of the vertical light shield 202 of the image sensor 101R in step ST13. Step ST13 includes steps ST13a and ST13b.

In step ST13a, the streaking correcting circuit 110 calculates an average of values of the pixels constituting the vertical light shield 202, so as to reduce random noise in a space axis direction (the average calculator 141 of the black level detecting unit 140). Then, in step ST13b, the streaking correcting circuit 110 performs filtering in the time axis direction on the pixel average, so as to reduce random noise in the time axis direction (the IIR filter 142 of the black level detecting unit 140).

After the above-described steps ST12 and ST13, the streaking correcting circuit 110 performs a streaking correcting process in step ST14. Step ST14 includes ST14a to ST14d.

In step ST14a, the streaking correcting circuit 110 subtracts the black level obtained in step ST13 from each of the signal levels of the respective lines in the horizontal light shield 201 obtained in step ST12, so as to generate streaking correction signals of the respective lines (streaking components of the respective lines) Rst' (the subtracter 150).

Then, in step ST14b, the streaking correcting circuit 110 performs a coring process on the streaking correction signals Rst' of the respective lines, so as to generate final streaking correction signals Rst" of the respective lines by removing minute noise while maintaining edge components (the coring unit 160).

In step ST14c, the streaking correcting circuit 110 generates correction gains Gr corresponding to respective signal levels Ldet (the signal level detector 122 and the correction gain generator 123), and multiplies each of the streaking correction signals Rst" of the respective lines by the corresponding correction gain Gr, so as to generate gain-adjusted streaking correction signals Rst (the multiplier 124).

In step ST14d, the streaking correcting circuit 110 subtracts the corresponding streaking correction signals Rst from red data segments Rin of the respective lines, so as to obtain streaking-corrected red data Rout (the subtractor 112).

The flowchart in FIG. 13 illustrates the procedure of the streaking correcting process performed on the red data Rin. In the streaking correcting circuit 110, streaking correction is performed also on the green data Gin and the blue data Bin in the same manner.

As described above, in the streaking correcting circuit 110 illustrated in FIG. 2, streaking correction signals Rst, Gst, and Bst are generated by using only output signals of the light shields (the horizontal light shield 201 and the vertical light shield 202) of the image sensors 101R, 101G, and 101B. Accordingly, streaking correction signals can be obtained in real time without shielding the light receiving unit 203 of the image sensors 101R, 101G, and 101B, and thus streaking can be corrected in real time. In this case, there is no need to frequently shield the light receiving unit 203 during shooting, and thus efficiency of obtaining video signals does not decrease.

In the streaking correcting circuit 110 illustrated in FIG. 2, streaking correction signals Rst, Gst, and Bst, which are generated by multiplying each of the streaking correction signals Rst" generated in the correction signal generator 121 by the correction gain Gr according to the signal level Ldet, are used. Accordingly, the accuracy of streaking correction can be enhanced.

Also, in the streaking correcting circuit 110 illustrated in FIG. 2, the correction signal generator 121 performs a process by adding a predetermined number of bits under the most significant bit (LSB) of the output signals of the image sensors 101R, 101G, and 101B. The correction signal generator 121 can avoid discarding of a component under the LSB generated in the IIR filter processing or the like, and streaking correction signals Rst" corresponding to a streaking component of a level under the LSB can be generated. Accordingly, the accuracy of streaking correction can be further enhanced.

As described above, an embodiment or embodiments of the present invention may be configured as a circuit or device. Additionally, another embodiment or embodiments of the present invention may be configured or directed to a method thereof. Still further, another embodiment or embodiments of the present invention may be implemented as a program which may be stored on a computer readable medium which may be implemented by a computer.

It should be understood by those skilled in the art that various modifications, combinations, sub-combinations and alterations may occur depending on design requirements and other factors insofar as they are within the scope of the appended claims or the equivalents thereof.

What is claimed is:

1. A streaking correction signal generating circuit comprising:
    a light-shield waveform detecting unit configured to detect signal levels of respective lines in a horizontal light shield by using an output signal of the horizontal light shield of an image sensor;
    a black level detecting unit configured to detect a black level by using an output signal of a vertical light shield of the image sensor; and
    a subtracting unit configured to subtract the black level detected by the black level detecting unit from each of the signal levels of the respective lines in the horizontal light shield detected by the light-shield waveform detecting unit so as to generate streaking correction signals of the respective lines,
    wherein the light-shield waveform detecting unit includes
    an average calculator configured to calculate averages of values of pixels constituting the horizontal light shield in units of lines;
    a digital filter configured to average the pixel averages of the respective lines calculated in the average calculator in a time direction;
    an ε filter applied in a vertical direction to the pixel averages of the respective lines output from the digital filter; and
    a median filter applied in the vertical direction to the pixel averages of the respective lines output from the ε filter, and wherein the signal levels of the respective lines in the horizontal light shield are obtained from the median filter.

2. A streaking correction signal generating circuit comprising:
    a light-shield waveform detecting unit configured to detect signal levels of respective lines in a horizontal light shield by using an output signal of the horizontal light shield of an image sensor;
    a black level detecting unit configured to detect a black level by using an output signal of a vertical light shield of the image sensor; and
    a subtracting unit configured to subtract the black level detected by the black level detecting unit from each of the signal levels of the respective lines in the horizontal light shield detected by the light-shield waveform detecting unit so as to generate streaking correction signals of the respective lines,
    wherein the light-shield waveform detecting unit, the black level detecting unit, and the subtracting unit perform a process by adding a predetermined number of bits under the least significant bit of the output signal of the image sensor.

3. A streaking correction signal generating circuit comprising:
    a light-shield waveform detecting unit configured to detect signal levels of respective lines in a horizontal light shield by using an output signal of the horizontal light shield of an image sensor;
    a black level detecting unit configured to detect a black level by using an output signal of a vertical light shield of the image sensor; and
    a subtracting unit configured to subtract the black level detected by the black level detecting unit from each of the signal levels of the respective lines in the horizontal light shield detected by the light-shield waveform detecting unit so as to generate streaking correction signals of the respective lines,
    wherein the black level detecting unit includes
    an average calculator configured to calculate an average of values of pixels constituting the vertical light shield; and
    a digital filter configured to average the pixel average calculated by the average calculator in a time direction, and
    wherein the black level is obtained from the digital filter.

4. A streaking correction signal generating method comprising the steps of:
    detecting signal levels of respective lines in a horizontal light shield by using an output signal of the horizontal light shield of an image sensor;
    detecting a black level by using an output signal of a vertical light shield of the image sensor; and
    subtracting the black level detected in the black level detecting step from each of the signal levels of the respective lines in the horizontal light shield detected in the signal level detecting step so as to generate streaking correction signals of the respective lines,
    wherein the signal level detecting step, the black level detecting step, and the subtracting step perform a process by adding a predetermined number of bits under the least significant bit of the output signal of the image sensor.

5. A non-transitory computer readable medium having stored thereon a program allowing a computer to perform the following:
    detecting signal levels of respective lines in a horizontal light shield by using an output signal of the horizontal light shield of an image sensor;

detecting a black level by using an output signal of a vertical light shield of the image sensor; and subtracting the detected black level from each of the detected signal levels of the respective lines in the horizontal light shield so as to generate streaking correction signals of the respective lines, wherein the signal level detecting step, the black level detecting step, and the subtracting step perform a process by adding a predetermined number of bits under the least significant bit of the output signal of the image sensor.

6. A streaking correcting circuit comprising:

a streaking correction signal generating unit configured to generate streaking correction signals of respective lines based on an output signal of an image sensor; and a subtracter configured to subtract the streaking correction signal of a corresponding line generated by the streaking correction signal generating unit from the output signal of each line of the image sensor so as to obtain streaking-corrected output signals, wherein the streaking correction signal generating unit includes light-shield waveform detecting means for detecting signal levels of respective lines in a horizontal light shield by using an output signal of the horizontal light shield of the image sensor;

black level detecting means for detecting a black level by using an output signal of a vertical light shield of the image sensor; and subtracting means for subtracting the black level detected by the black level detecting means from each of the signal levels of the respective lines in the horizontal light shield detected by the light-shield waveform detecting means so as to generate the streaking correction signals of the respective lines, and the streaking correcting circuit further comprising:

a correction gain generating unit configured to generate a correction gain to the signal level of the output signal of the image sensor; and a multiplying unit configured to multiply the streaking correction signal generated by the streaking correction signal generating unit by the correction gain generated by the correction gain generating unit, wherein the subtracter subtracts the streaking correction signal multiplied by the correction gain by the multiplying unit from the output signal of the image sensor, and wherein the correction gain generating unit includes a signal level detecting unit configured to detect a level of the output signal of the image sensor; and a memory configured to output a correction gain corresponding to the level detected by the signal level detecting unit.

7. A streaking correcting comprising:

a streaking correction signal generating unit configured to generate streaking correction signals of respective lines based on an output signal of an image sensor; and a subtracter configured to subtract the streaking correction signal of a corresponding line generated by the streaking correction signal generating unit from the output signal of each line of the image sensor so as to obtain streaking-corrected output signals, wherein the streaking correction signal generating unit includes light-shield waveform detecting means for detecting signal levels of respective lines in a horizontal light shield by using an output signal of the horizontal light shield of the image sensor;

black level detecting means for detecting a black level by using an output signal of a vertical light shield of the image sensor; and subtracting means for subtracting the black level detected by the black level detecting means from each of the signal levels of the respective lines in the horizontal light shield detected by the light-shield waveform detecting means so as to generate the streaking correction signals of the respective lines, and the streaking correcting circuit further comprising:

a correction gain generating unit configured to generate a correction gain to the signal level of the output signal of the image sensor; and a multiplying unit configured to multiply the streaking correction signal generated by the streaking correction signal generating unit by the correction gain generated by the correction gain generating unit, wherein the subtracter subtracts the streaking correction signal multiplied by the correction gain by the multiplying unit from the output signal of the image sensor, and wherein the correction gain generating unit includes a signal level detecting unit configured to detect a level of the output signal of the image sensor;

a memory configured to output correction gains on both ends of a level range including the level detected by the signal level detecting unit; and a processing unit configured to calculate a correction gain corresponding to the level detected by the signal level detecting unit based on the level detected by the signal level detecting unit and the correction gains on the both ends output from the memory.

8. An imaging device comprising:

an image sensor including a horizontal light shield and a vertical light shield;

a streaking correction signal generating circuit configured to generate streaking correction, signals of respective lines based on an output signal of the image sensor; and a subtractor configured to subtract the streaking correction signal of a corresponding line generated by the streaking correction signal generating circuit from the output signal of each line of the image sensor so as to obtain streaking-corrected output signals, wherein the streaking correction signal generating circuit includes a light-shield waveform detecting unit configured to detect signal levels of respective lines in the horizontal light shield by using an output signal of the horizontal light shield of the image sensor;

a black level detecting unit configured to detect a black level by using an output signal of the vertical light shield of the image sensor; and a subtracting unit configured to subtract the black level detected by the black level detecting unit from each of the signal levels of the respective lines in the horizontal light shield detected by the light-shield waveform detecting unit so as to generate the streaking correction signals of the respective lines, wherein the light-shield waveform detecting unit, the black level detecting unit, and the subtracting unit perform a process by adding a predetermined number of bits under the least significant bit of the output signal of the image sensor.

* * * * *